April 19, 1949.                 G. LUBIN                  2,467,395
                OPTICAL PROJECTION MICROSCOPE
                     COMPARATOR APPARATUS
                     Filed June 23, 1945
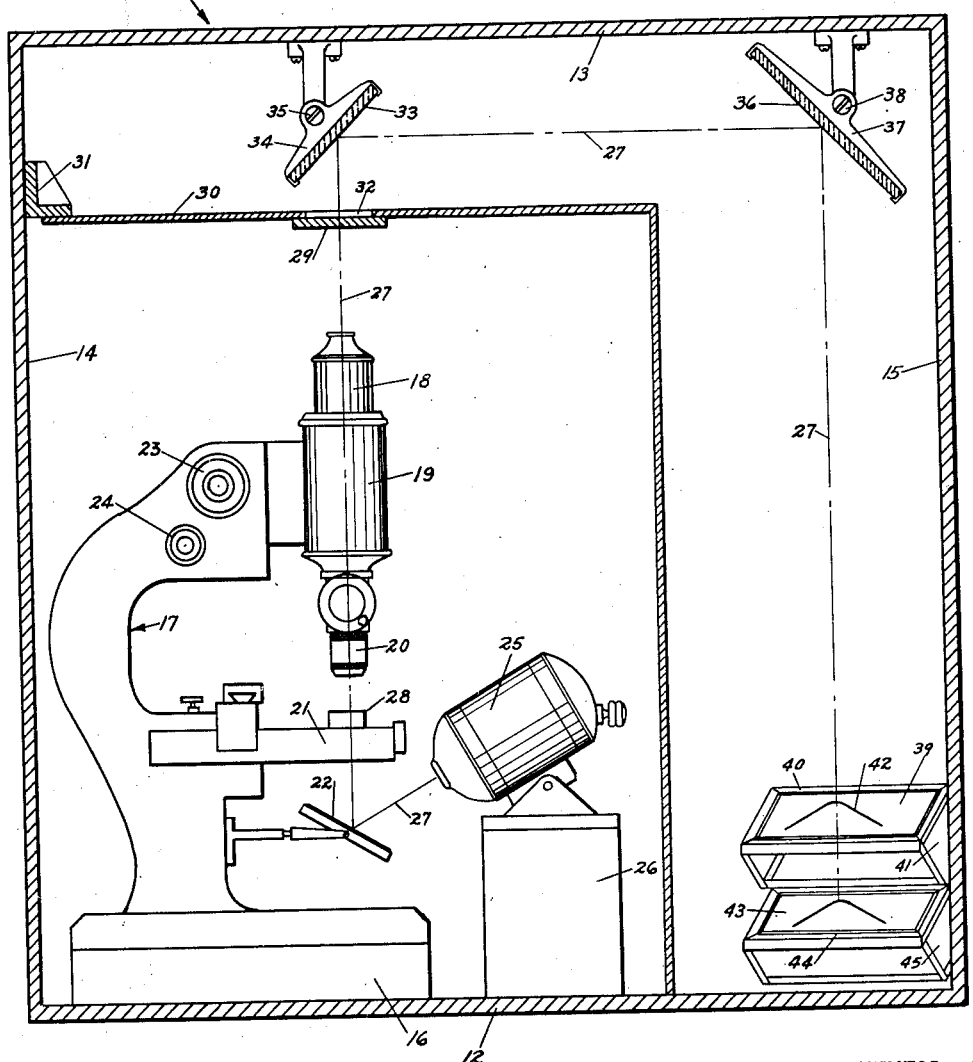
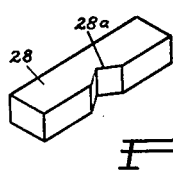
INVENTOR.
George Lubin
BY
Ralph L. Chappell
ATTORNEY.

Patented Apr. 19, 1949

2,467,395

UNITED STATES PATENT OFFICE 2,467,395

OPTICAL PROJECTION MICROSCOPE COMPARATOR APPARATUS

George Lubin, New York, N. Y.

Application June 23, 1945, Serial No. 601,282

2 Claims. (Cl. 88—24)

(Granted under the act of March 3, 1883, as amended April 30, 1928; 370 O. G. 757)

The present invention relates to an optical device for comparing exactly an object to be examined with a predetermined standard and, if desired, making a permanent record of the comparison.

In the fabrication of many objects it is desirable that the shape, texture and other characteristics of the object shall conform to those of a standard. This can be accurately determined by use of the present invention, which produces a magnified image of the object to be examined and projects it upon a surface in comparison with an enlarged image or simulated image of a standard. In the case of small objects or characteristics, it is desirable to use a microscope system for producing a magnified image. It is frequently advantageous to provide a photographic record of the comparison. This is preferably accomplished by providing a simulated image of the standard on a transparent surface, placing a photographic film adjacent the transparent surface and then superimposing an image of the object being examined over the simulated standard image to record the superimposed images on the film.

For example, the specimen used in performing certain impact strength tests on plastic materials is an elongated bar approximately 2½ inches long and ½ inch thick. In this bar a dihedral notch is formed by milling, shaping or other machining operation. It has been found that small differences in the configuration of the notch cause great difference in the final impact strength test results. It is therefore important that the configuration of the notches in the various specimens shall be as nearly identical as possible. To insure uniformity in the notches the present invention can be employed to magnify the profile of the notch in a given specimen and project the image thereof upon a surface on which is inscribed a simulated profile of a standard notch. Comparison of the profiles of the specimen notch and standard can thus be easily made and a permanent record thereof can be made, if desired, by recording the comparison upon a photographic film. The features of comparison in such a case would be the general configuration of the notch, the size of the notch, and the sharpness of the edges of the notch. By proper adjustment the microscope can be focused upon the notch at any depth level of the dihedral surface thereof that it is desired to compare with the standard. Thus the entire surface of the notch can be examined and compared with the standard by progressively adjusting the microscope to different depth levels of the dihedral notch in the specimen.

An object of the invention is to provide an optical device for comparing an object to be examined with a standard by projecting an image of the object on a surface in comparison with an image or simulated image of the standard.

Another object is to provide such an optical device in which magnification of the image is produced by use of a microscope.

Another object is to provide such a device in which the image of the object being examined and the image of a standard can be projected on photographic film to make a permanent record thereof.

Another object is to provide a device whereby an enlarged image of the profile of the object is provided by a microscope that can be focused on the profile at any depth level thereof.

Other objects and advantages of this invention, as well as its construction, arrangement and operation, will be apparent from the following description and claims in connection with the accompanying drawing, in which Fig. 1 is a side elevational view partially in section showing a preferred embodiment of the invention.

Fig. 2 is an isometric view showing a specimen to be examined in the apparatus of Fig. 1.

There is shown a preferred embodiment of the invention comprising a frame 11 having a bottom 12, a top 13 and sides 14 and 15. Frame 11 is box-like in shape.

Mounted in frame 11 upon a support 16 is a microscope 17 of conventional design. Microscope 17 is provided with an eyepiece 18, a tube 19, an objective 20, a stage 21 and a mirror 22. A rack and pinion 23 are provided for making coarse focusing adjustment and screw 24 is provided for making fine focusing adjustments. A light source 25 is mounted in frame 11 upon a support 26 for providing a beam of light 27 that is reflected by mirror 22 to microscope 17. A specimen 28 having a dihedral notch 28a to be examined is indicated upon stage 21. Disposed above microscope 17 is a shutter 29 mounted upon a support 30 that in turn is mounted with respect to frame 11 by bracket 31. Shutter 29 is adapted to cover selectively or uncover an opening 32 provided in support 30. Opening 32 is positioned in the path of light beam 27 projecting from the eyepiece 18.

A mirror 33 is mounted above shutter 29 upon a bracket 34 and arranged for angular adjustment relative to frame 11 by locking screw 35.

A second mirror 36 is mounted on a bracket 37 in opposed relation to mirror 33 and arranged for angular adjustment relative to frame 11 by means of a lock screw 38.

Below mirror 36 is a transparent plate 39 disposed in a frame 40 and mounted with respect to frame 11 by a bracket 41. A simulated profile image 42 is inscribed upon plate 39. Located below plate 39 is a sensitized photographic film 43 disposed in a frame 44 and mounted with respect to frame 11 by bracket 45.

Light beam 27 from light source 25, after reflection from microscope mirror 22, passes through microscope 17 and emerges from eyepiece 18. When shutter 29 is open, light beam 27 passes through opening 32 and is reflected from mirror 33 and mirror 36 through transparent plate 39 to sensitized film 43.

Operation of the device is as follows. If it is desired to examine the configuration and other characteristics of notch 28a in specimen 28, the specimen 28 is placed upon stage 21 of microscope 17 and located so that notch 28a is in the optical line of vision of microscope objective 20. Light source 25 is turned on and microscope mirror 22 adjusted so that light beam 27 is reflected through specimen notch 28a and objective 20 of microscope 17. Rack and pinion 23 are adjusted until the microscope is roughly focused upon the particular depth level of notch 28a which it is desired to examine. Screw 24 is then adjusted to bring the microscope into exact focus upon the desired depth level of the notch. Focusing of microscope 17 as just described can be performed by the operator by using the naked eye in conjunction with the microscope eyepiece 18. Shutter 29 is open to permit passage of light beam 27 through opening 32, and mirrors 33 and 36 are angularly adjusted so that light beam 27 is reflected onto the transparent screen 39. A focused image of notch 28a is projected upon screen 39. Since the light rays in beam 27 diverge upon emerging from microscope eyepiece 18, the image projected upon screen 39 will be enlarged from the image seen in the microscope eyepiece by the naked eye in proportion to the distance travelled by beam 27 between eyepiece 18 and screen 39. An enlarged profile of notch 28a upon screen 39 can then be readily compared with the simulated profile 42 of a standard that is inscribed upon screen 39. Such comparison can be made relative to such characteristics as size of the notch, configuration of the notch, and sharpness of the edges of the notch.

If it is desired to make a permanent record of the enlarged profile of notch 28a, shutter 29 can be closed to cut off light beam 27 from screen 29 and a sensitized photographic film 43 can be inserted below screen 39 upon bracket 45. Shutter 29 can then be opened a sufficient length of time to make a proper exposure of film 43, whereby the enlarged profile image of notch 28a and simulated standard profile 42 are recorded thereon. If it is desired to make a photographic record of the profile image of notch 28a alone and without comparison with the standard image, transparent plate 39 with inscribed simulated standard image 42 can be removed from bracket 41 during exposure of photographic plate 43.

It is to be understood that various modifications and changes may be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. A portable comparator for comparing an image of an object with a simulated standard image, said comparator comprising a housing, said housing having a horizontal base, a partition having a substantially vertical portion extending upwardly from said base and a substantially horizontal portion at the upper extremity of the vertical portion, said partition forming a first chamber at one side of said housing beneath said horizontal partition and forming a second chamber at the other side of the housing and above said horizontal partition, a lamp on said base in the first chamber for projecting a light beam, a microscope on said base in the first chamber for focusing the light beam to project an image of an object mounted on the microscope, an opening in the horizontal partition above the microscope to permit passage of the light beam upwardly from the first chamber to the second chamber, a shutter for selectively opening and closing the opening, a pair of mirrors adjustably mounted on said housing in the second chamber for reflecting the light beam toward said base in the second chamber, one of said mirrors being disposed above the microscope and partition opening, a light-transmitting plate in the path of the light beam near the bottom of the second chamber, said plate having a simulated standard image formed thereon, said plate being adapted to have the image of the object projected thereon, and means below said plate for holding a photographic film.

2. A comparator comprising a housing, a partition in said housing forming a first chamber on one side of said partition and a second chamber on the other side of said partition, a light source in the first chamber, a microscope in the first chamber for focusing light from said source to project an image of an object mounted on the microscope, an opening in the partition to permit passage of the light beam from the first chamber to the second chamber, a shutter for the opening, mirror means in the second chamber for reflecting the light beam, a light-transmitting plate in the second chamber in the path of the light beam, said plate having a simulated standard image formed thereon, said plate being adapted to have the image of the object projected thereon, and means adjacent said plate for holding a photographic film.

GEORGE LUBIN.

REFERENCES CITED

The following references are of record in the file of this patent:

UNITED STATES PATENTS

| Number | Name | Date |
| --- | --- | --- |
| 1,273,881 | Lare | July 30, 1918 |
| 1,433,877 | Exton | Oct. 31, 1922 |
| 1,589,349 | Bausch et al. | June 22, 1926 |
| 1,601,864 | Leroux | Oct. 5, 1926 |
| 2,035,780 | Beardsley et al. | Mar. 31, 1936 |
| 2,185,926 | Senecal | Jan. 2, 1940 |
| 2,192,529 | Thomas et al. | Mar. 5, 1940 |
| 2,214,376 | Kurtz | Sept. 10, 1940 |
| 2,332,810 | Place | Oct. 26, 1943 |